United States Patent Office 3,729,495
Patented Apr. 24, 1973

3,729,495
PROCESS FOR THE PREPARATION OF
9α-CHLORO-11β-HYDROXY STEROIDS
Emanual Kaspar, deceased, late of Kamen, Germany, by Elisabeth Barbara Kaspar, main heir, Kamen, and Rainer Philippson, Bergkamen, Germany, assignors to Schering A.G., Berlin, Germany
No Drawing. Filed Mar. 4, 1971, Ser. No. 121,149
Claims priority, application Germany, Mar. 7, 1970, P 20 11 559.7
Int. Cl. C07c 169/34
U.S. Cl. 260—397.45   3 Claims

ABSTRACT OF THE DISCLOSURE

9α-chloro-11β-hydroxy steroids are produced by the reaction of a $\Delta^{9(11)}$-steroid with tert.-butyl hypochlorite in an inert, water immiscible solvent having a high dielectric constant, in the presence of perchloric acid.

BACKGROUND OF THE INVENTION

This invention relates to a process for the production of 9α-chloro-11β-hydroxy steroids.

It is known that by reacting unsaturated hydrocarbons with tert.-butyl hypochlorite in the presence of sulfuric or phosphoric acid, the corresponding sulfuric or phosphoric diesters are obtained (see J. Org. Chem. 25, 1835 (1960)).

It is also known that tert.-butyl hypochlorite acts both as an oxidizing agent and a chlorinating agent in the reaction with steroids such as, for example, cholesterol, the product being 6β-chloro-4-cholesten-3-one (see J. Am. Chem. Soc. 75, 5489 (1953)).

The conversion of a $\Delta^{9(11)}$-steroid to a 9α-chloro-11β-hydroxy steroid is a well known reaction. According to U.S. Pat. 3,057,886, it is conventional to produce 9α-chloro-11β-hydroxy steroids by treating the $\Delta^{9(11)}$-double bond of steroids of the pregnane series with aqueous hypochlorous acid, or with N-chloramides, N-chlorimides, or carboxylic acid derivatives, e.g., N-chloracetamide, in the presence of water and an inert solvent, including tertiary alcohols, e.g., tert.-butanol; ethers, e.g., diethyl ether, methyl isopropyl ether and dioxane; and ketones, optionally in the presence of a strong acid. In this process, considerable amounts of the undesired 9α,11β-dichloro steroid are obtained as a by-product, in addition to the desired 9α-chloro-11β-hydroxy steroid, which by-product can be separated only with difficulties.

SUMMARY OF THE INVENTION

In accordance with the process of this invention, 9α-chloro-11β-hydroxy steroids are produced in high purity and high yield by the reaction of $\Delta^{9(11)}$-steroids with tert.-butyl hypochlorite in an inert, water-immiscible solvent and in the presence of perchloric acid.

It is surprising that 9α-halo-11β-hydroxy steroids are obtained in nearly pure form and in very high yields. The process of this invention has the additional advantage that no appreciable side reactions occur, such as 9α,11β-dichlorination and allylchlorination, which yields the corresponding 12α-chloro-$\Delta^{9(11)}$-steroids.

DETAILED DISCUSSION

The reaction is usually conducted at a temperature from about 0° C. to the decomposition temperature of the tert.-butyl hypochlorite, preferably between about 0 and 50° C. Solvents of a high dielectric constant used as solvents of the process of this invention are those having a dielectric constant of at least 25 at 25° C., e.g., a nitrohydrocarbon, including nitroalkanes, e.g., nitromethane and nitroethane, and nitroaromatics, e.g., nitrobenzene, etc.

The amount of reaction solvent is not critical. Ordinarily, an amount is employed which maintains all of the starting $\Delta^{9(11)}$-steroid in solution at the selected reaction temperature. To ensure complete reaction and thus a high purity product, the amount of tertiary butyl hypochlorite which is employed is preferably at least about a molar equivalent, calculated on the starting steroid, e.g., from about 1 to 3 equivalents, preferably about 1.1 to 2 equivalents. It will be apparent that if other groups are present in the molecule which are susceptible to reaction with the tert.-butyl hypochlorite, correspondingly greater amounts will be required to achieve complete reaction.

The amount of perchloric acid which is employed is at least from about 0.001 to 1 molar equivalent, preferably about 0.01 to 0.5 molar equivalent, calculated on the starting steroid.

The starting steroids can be any $\Delta^{9(11)}$-steroid. Because the conversion of $\Delta^{9(11)}$-steroids to 9α-chloro-11β-hydroxy steroids is a well known reaction, types of $\Delta^{9(11)}$-steroids which can be employed as starting compounds for the process of this invention are well known to those skilled in the art.

The starting $\Delta^{9(11)}$-steroids can contain substituents which are customary in steroid compounds. Specific examples are free, esterified, or etherified hydroxy groups, e.g., in the 3-, 16-, 17-, and/or 21-position; free or functionally modified, e.g., ketalized, keto groups, e.g., in the 3- and/or 20-positions, lower-alkyl, preferably methyl, groups, e.g., in the 1-, 2-, 6-, 7-, 16-, and/or 18-positions; halogen atoms, preferably fluoro or chloro, e.g., in the 2-, 4-, 6-, 7-, and/or 16-positions. A hydrogen atom, when present in the 5-position can be of 5α- or 5β-configuration.

Preferred starting substances are $\Delta^{9(11)}$-steroid compounds of the pregnane series having the general formula

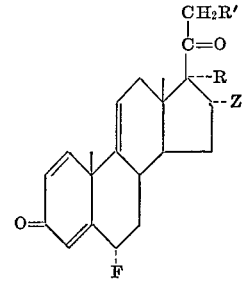

wherein Z is hydrogen or methyl, and R and R' each are hydrogen or a free of esterified hydroxy group.

Suitable as esterified hydroxy groups are esters of physiologically compatible acids. Preferred acids are carboxylic acids of up to 15 carbon atoms. The carboxylic acids can also be unsaturated, branched, polybasic, or substituted in the usual manner, for example by hydroxy or amino groups, or by halogen atoms. Also suitable are cycloaliphatic, aromatic, mixed aromatic-aliphatic, and heterocyclic acids, which can likewise be substituted in a conventional manner. Specific examples of such acids are acetic acid, propionic acid, butyric acid, valeric acid, caproic acid, enanthic acid, undecylic acid, trimethylacetic acid, diethylacetic acid, tert.-butylacetic acid, phenylacetic acid, cyclopentylpropionic acid, oleic acid, lactic acid, mono-, di-, and trichloroacetic acid, aminoacetic acid, succinic acid, adipic acid, benzoic acid, and nicotinic acid. Also suitable are steroids wherein R and/or R' are esters of an inorganic acid, such as, for example, sulfuric acid and phosphoric acid.

If desired, when the reaction product contains an acyloxy group or a free hydroxy group, the above-described reaction can be followed by a reaction wherein such a group in the thus-obtained product is conventionally saponified or esterified respectively. The saponification or esterification which can optionally follow the process of this invention can be conducted in a conventional manner.

The products of the process of this invention are either valuable pharmaceuticals with activity in their own right, such as, for example, the known antiphlogistic "Clocortolone," or they are useful as intermediates for the preparation of such pharmaceuticals by reactions well known in the art.

The following examples are intended as an explanation of this invention.

Without further elaboration, it is believed that one skilled in the art can, using the preceding description, utilize the present invention to its fullest extent. The following preferred specific embodiments are, therefore to be construed as merely illustrative, and not limitative of the remainder of the disclosure in any way whatsoever.

EXAMPLE 1

17.6 g. of 6α-fluoro-21-trimethylacetoxy-16α-methyl-1,4,9(11)-pregnatriene-3,20-dione is suspended in 35 ml. of nitroethane and heated to 40° C. To this suspension is added 13.2 ml. of 1 N perchloric acid, and then 5.9 ml. of tert.-butyl hypochlorite is added dropwise within 20 minutes in such a manner that a temperature of 45° C. is not exceeded. The mixture is then stirred for 45 minutes, allowed to cool to room temperature, and 105 ml. of methanol is added. Thereafter, the suspension is stirred into 2.5 l. of ice water and agitated for 1.5 hours. The thus-precipitated product is filtered, washed, dried, and treated with hot methanol, thus obtaining 16.7 g. of 6α-fluoro-9α-chloro-11β-hydroxy - 21 - trimethylacetoxy-16α-methyl-1,4-pregnadiene-3,20-dione, M.P. 233–235° C. (decomposition).

EXAMPLE 2

440 mg. of 6α-fluoro-21-trimethylacetoxy-16α-methyl-1,4,9(11)-pregnatriene-3,20-dione is suspended in 4.5 ml. of nitromethane. To this suspension is first added, at +5° C., 0.5 ml. of 1 N perchloric acid, and thereafter 0.145 ml. of tert.-butyl hypochlorite is introduced. The reaction mixture is agitated for 3.5 hours at +5° C. Then, the 6α-fluoro-9α-chloro-11β-hydroxy - 21 - trimethylacetoxy-16α-methyl-1,4-pregnadiene-3,20-dione is filtered, washed with a small amount of nitromethane, dried, treated with methanol, and again filtered and dried, thus obtaining 310 mg. of this product, M.P. 233–235° C. (decomposition).

EXAMPLE 3

440 mg. of 6α-fluoro-21-trimethylacetoxy-16α-methyl-1,4,9(11)-pregnatriene-3,20-dione is suspended in 4.5 ml. of nitrobenzene and cooled to +5° C. First, 0.5 ml. of 1 N perchloric acid is added thereto, and thereafter 0.145 ml. of tert.-butyl hypochlorite is introduced into the suspension. Then, the reaction mixture is agitated for 3.5 hours at +5° C. After termination of the reaction, 15 ml. of methanol is added and the thus-precipitated product is vacuum-filtered, washed, dried, treated with methanol, again vacuum-filtered, and dried, thus obtaining 380 mg. of 6α-fluoro-9α-chloro-11β-hydroxy-21-trimethylacetoxy-16α-methyl-1,4-pregnadiene-3,20-dione, M.P. 233–235° C. (decomposition).

EXAMPLE 4

2.3 g. of 6α-fluoro-21-hexanoyloxy-16α-methyl-1,4,9(11)-pregnatriene-3,20-dione is suspended in 2.3 ml. of nitroethane and heated to 40° C. First, 1.7 ml. of 1 N perchloric acid is added thereto, and then 0.75 ml. of tert.-butyl hypochlorite is introduced. Thereafter, the reaction mixture is stirred for 30 minutes at 40° C. Then, 11.5 ml. of methanol is added, the mixture is stirred for another 5 minutes, and the solution is thereafter poured slowly into 350 ml. of water containing 570 mg. of sodium sulfite. The mixture is stirred for several hours at 0° C., and the thus-precipitated product is filtered, washed neutral with water, dried, and recrystallized from acetone/hexane, thus obtaining 1.7 g. of 6α-fluoro-9α-chloro-11β-hydroxy - 21 - hexanoyloxy-16α-methyl-1,4-pregnadiene-3,20-dione, M.P. 157–159° C.

EXAMPLE 5

772 mg. of 17α-hydroxy-21-acetoxy-4,9(11)-pregnadiene-3,20-dione is suspended in 1.55 ml. of nitroethane, heated to 40° C., and then mixed first with 0.74 ml. of 1 N perchloric acid and then with 0.29 ml. of tert.-butyl hypochlorite. The reaction mixture is agitated for 30 minutes at 40° C., cooled to room temperature, mixed with 8 ml. of methanol, stirred for another 5 minutes, and then poured into 250 ml. of water containing 0.5 g. of sodium sulfite. The mixture is then stirred for another 2 hours, the thus-precipitated product is filtered, washed neutral with water, dried; the crude product is washed with methanol, and recrystallized from ethanol, thus obtaining 9α-chloro-11β,17α-dihydroxy - 21 - acetoxy-4-pregnene-3,20-dione, M.P. 192–194° C. (decomposition).

EXAMPLE 6

Analogously to Example 5, 17α,21-dihydroxy-4,9(11)-pregnadiene-3,20-dione is reacted with tert.-butyl hypochlorite, thus producing 9α-chloro-11β,17α,21-trihydroxy-4-pregnene-3,20-dione, M.P. 224–226° C. (decomposition).

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of a 9α-chloro-11β-hydroxypregnane steroid from a $\Delta^{9(11)}$-pregnane steroid the improvement which comprises reacting the $\Delta^{9(11)}$-pregnane steroid with tert.-butyl hypochlorite in an inert, water-immiscible nitrohydrocarbon solvent having a dielectric constant of at least 25 at 25° C. in the presence of perchloric acid.

2. A process according to claim 1 wherein the solvent is nitromethane, nitroethane, or nitrobenzene.

3. A process according to claim 1 wherein the starting $\Delta^{9(11)}$-steroid is a compound of the formula

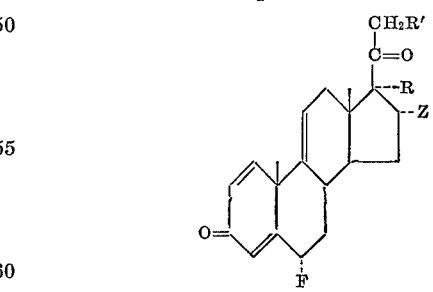

wherein Z is hydrogen or methyl and R and R′ are hydrogen or a free or esterified hydroxy group.

References Cited

UNITED STATES PATENTS 3,057,886  10/1962  Fried et al. _____ 260—397.45

FOREIGN PATENTS 1,350,100  12/1962  France _____ 260—397.4

HENRY A. FRENCH, Primary Examiner

U.S. Cl. X.R.

260—999